United States Patent
Radu et al.

(10) Patent No.: US 10,074,085 B2
(45) Date of Patent: Sep. 11, 2018

(54) VIRTUAL POS SYSTEM AND METHOD

(71) Applicant: MasterCard International Incorporated, Purchase, NY (US)

(72) Inventors: Cristian Radu, Beauvechain (BE); David A. Roberts, Warrington (GB)

(73) Assignee: Mastercard International Incorporated, Purchase, NY (US)

( * ) Notice: Subject to any disclaimer, the term of this patent is extended or adjusted under 35 U.S.C. 154(b) by 744 days.

(21) Appl. No.: 14/511,390

(22) Filed: Oct. 10, 2014

(65) Prior Publication Data

US 2015/0106217 A1 Apr. 16, 2015

(30) Foreign Application Priority Data

Oct. 11, 2013 (GB) .................................. 1318077.3

(51) Int. Cl.
G06Q 20/20 (2012.01)
G06Q 20/32 (2012.01)

(52) U.S. Cl.
CPC ........... *G06Q 20/202* (2013.01); *G06Q 20/20* (2013.01); *G06Q 20/3227* (2013.01); *G06Q 20/3229* (2013.01)

(58) Field of Classification Search
None
See application file for complete search history.

(56) References Cited

U.S. PATENT DOCUMENTS

| 8,898,746 B2 * | 11/2014 | Gregg | H04L 63/10 |
| | | | 726/29 |
| 2010/0199089 A1 * | 8/2010 | Vysogorets | G06F 21/34 |
| | | | 713/168 |

(Continued)

FOREIGN PATENT DOCUMENTS

| WO | 2010128442 A2 | 11/2010 |
| WO | 2012114260 A1 | 8/2012 |

(Continued)

OTHER PUBLICATIONS

Patents Act 1977: Search Report under Section 17(5), Intellectual Property Office, dated Mar. 21, 2014, for GB Patent Application No. 1318077.3, 4pgs.

*Primary Examiner* — Florian M Zeender
*Assistant Examiner* — Denisse Y Ortiz Roman
(74) *Attorney, Agent, or Firm* — Buckley, Maschoff & Talwalkar LLC

(57) ABSTRACT

The present invention relates to a token device for securely executing a data transaction. The token device comprises: a secure element; a web server module configured within the secure element and arranged to transmit data messages over a network; a terminal application module configured within the web server module; and an application module configured within the secure element. The terminal application module and the application module are arranged to execute the data transaction protocol as one or more data exchanges therebetween within the secure element, upon receipt of a service request data message, received over the network at the web server module from an authorized remotely located Point of Sale (POS) terminal. The web server module is subsequently arranged to generate a transaction response data message for transmission to the remotely located POS terminal, on successful completion of the transaction protocol.

31 Claims, 7 Drawing Sheets

(56) References Cited

U.S. PATENT DOCUMENTS

2011/0270751 A1\* 11/2011 Csinger .................. G06F 21/40
705/42
2013/0124351 A1 5/2013 Fisher
2013/0291084 A1\* 10/2013 Amiel ..................... H04L 63/10
726/9

FOREIGN PATENT DOCUMENTS

WO 2012140625 A1 10/2012
WO 2012143911 A1 10/2012

\* cited by examiner

VIRTUAL POS SYSTEM AND METHOD

CROSS-REFERENCE TO RELATED APPLICATION

This application is a U.S. National Stage filing under 35 U.S.C. § 119, based on and claiming benefit of and priority to GB Patent Application No. 1318077.3 filed Oct. 11, 2013.

FIELD OF THE INVENTION

The present invention relates to the field of secure transaction systems, and specifically to a system and method for executing a transaction between a token device and a virtual, cloud-based point-of-sale terminal.

BACKGROUND OF THE INVENTION

Existing credit and/or debit card retail transaction systems typically require the use of a point-of-sale (POS) terminal. Typically, the POS terminal comprises electronic hardware apparatus configured with the encryption keys and the certificates associated with the supported transaction protocols. The primary role of the POS is to securely transmit credit and/or debit card details and transaction details to a remote issuer server for processing, in order to execute a desired retail transaction. Existing, known POS terminals are provided with a card reader, which typically relates to any one of: a magnetic stripe reader, an integrated circuit chip (ICC) reader, or a contactless front-end. The card reader enables a secure data connection to be established between the POS and the credit/debit card, such that confidential account information associated with the credit/debit card that is required to carry out the retail transaction can be accessed by the POS terminal.

For illustrative purposes only and to facilitate the reader's understanding of the prior art, a conventional credit/debit card retail transaction system is now described with reference to FIG. 1a. To effect a transaction the smartcard 130, which may comprise an ICC 132, is brought into operative communication with the POS terminal 134. This is conventionally achieved by inserting the smartcard 130 into a card reader 136 comprised within the POS terminal 134. The card reader operatively powers the smartcard's ICC 132, such that the required transaction protocol may be executed. To this end, the smartcard's ICC 132 is provided with a Payment Application (PA) 138, and the POS terminal 134 is provided with a Terminal Payment Application (TPA) 140. When run in combination, the PA 138 and the TPA 140 enable the desired transaction protocol, such as the EMV protocol based on ISO/IEC 7816, to be carried out between the smartcard 130 and the POS terminal 134. This comprises executing a plurality of data exchanges between the smartcard's PA 138 and the POS' TPA 140. On completion of the EMV protocol a digital transaction receipt is generated at the POS terminal 134. This digital transaction record is subsequently forwarded to the acquirer 142 by the POS terminal 134, and serves as a proof of transaction. The digital transaction receipt is forwarded to the acquirer 142 via an acquirer communication network 144, which the POS terminal 134 is configured to communicate with. To this end, the POS terminal 134 is provided with a Network Access Device (NAD) 146, which relates to an electronic circuit that automatically connects the POS terminal to the acquirer's communications network 144. The digital transaction receipt may subsequently be forwarded to a card issuer 148 for settlement.

Given the confidential nature of the data processed by the POS terminal 134, frequent maintenance is required to ensure the faultless operation of the terminal. Frequent firmware and/or software updates are required to ensure that the POS terminal 134 is provided with the latest up-to-date encryption keys and certificates, without which, it would not be possible to execute the transaction. The software and/or firmware updates are also required to ensure that the POS terminal 134 is resistant to newly identified security threats, which may relate to newly uncovered security weaknesses present in the adopted transaction protocol. Furthermore, periodic hardware certification is required to ensure the correct and faultless operation of the terminal.

The running maintenance costs required to ensure secure and faultless operation of the POS terminal can be significant, and are often passed to the retailer. When new technology standards are adopted, often wholescale replacement of POS terminal hardware is required, at significant expense to the retailer. Whilst a large multi-national retailer may be able to absorb such expenses, the economic burden on small retailers, with low turnover, can be prohibitive.

In recent times, the payments industry has experienced a paradigm shift towards mobile payment solutions. The objective of such solutions is to enable the use of mobile devices in effecting financial transactions, including retail transactions. For example, the use of mobile telephones and/or smartphones to effect payment for a consumer goods item. Significant amounts of time and effort have been expended by the payments industry (e.g. MasterCard®, Visa®, American Express®) to make existing transaction protocols secure for use by mobile devices. This in turn has resulted in an increase in the functional complexity of POS terminals, which are now required to support secure communication with mobile devices. This can be achieved through use of short distance communication protocols that support data transactions over short distances. Near field communication (NFC), and Bluetooth®, are some non-limiting examples of short distance communication protocols. Extending short distance communication protocol functionality to POS terminals requires updating both the hardware and software, and ultimately increases the cost of the POS terminal to the retailer.

FIG. 1b is a schematic illustration of an existing virtual POS transaction system, which enables a smartphone 150 to participate in a financial transaction, for example a credit and/or debit card transaction. The smartphone 150 comprises a contactless front end 152, which may relate to NFC or Bluetooth for example. The contactless front end 152 enables a communication channel 154 to be established between the smartphone 150 and the POS terminal 156, when the smartphone 150 is located in the vicinity of the POS terminal 156. The POS terminal 156 is commonly referred to as an M-POS (Mobile Point of Sale) terminal. Establishing the communication channel 154 may comprise an initial handshake exchange between the smartphone 150 and the POS terminal 156, which handshake may comprise the exchange of cryptographic keys and/or certificates suitable for ensuring that data communications between the smartphone 150 and the POS terminal 156 are securely encrypted. The POS terminal 156 also comprises a transceiver 158 and a NAD 162 for communicating over an existing communications network such as the illustrated mobile telephone network 160. All data communications associated with the implemented payment transaction protocol are routed through the POS terminal 156 for the duration of the protocol.

In order to execute a payment transaction protocol, such as the EMV protocol, the smartphone 150 is provided with a PA 166, the POS terminal 156 is provided with a "thin TPA" 168, and the PSP 164 is provided with a "thick TPA" 170. In contrast with the example illustrated in FIG. 1a, the functionality of the TPA is now provided by the POS terminal's thin TPA 168 in combination with the PSP's thick TPA 170. The thin TPA 168 is a scaled back version of the TPA 140 of the traditional POS terminal 134 of FIG. 1a and is configured to execute very simple commands, whereas the thick TPA 170 executes the majority of the EMV commands and processing, and is complex and prone to modifications. Some of the EMV commands are shared between the thin TPA 168 and the thick TPA 170 within a secure channel established over the mobile telephone network 160 and the shared communications network 172, between the POS terminal 156 and the PSP 164. The secure channel is established using conventional cryptographic means, for example via cryptographic key/certificate exchange. All data transmissions and commands transmitted from the smartphone's PA 166 to the POS terminal's thin TPA 168, are forwarded to the PSP's thick TPA 170 using the POS terminal's telephone network 160, and the shared communications network 172, which the PSP 164 is operatively connected to. In this way all transaction protocol data exchanges are transmitted between the POS terminal 156 and the PSP 164. The majority of the functionality of the traditional POS terminal 134 as illustrated in FIG. 1a is now provided by the remotely located PSP 164 running the thick TPA 170. The transaction protocol, such as the EMV protocol is executed between the smartphone's PA 166, the POS' think TPA 168, and the PSP's thick TPA 170.

The POS terminal's software requirements are simplified and reduced by effectively outsourcing the conventional TPA functionality to the remotely located PSP 164, and using the POS terminal's native communication means, in particular the telecommunications network 160, to relay data exchanges between the POS terminal 156 and the PSP 164. However, this configuration requires robust security features in place within the POS terminal 156 to protect the security of confidential information. For example, PIN verification. The payment card industry (PCI) adopt standards, referred to as PIN Transaction Security (PTS) that define how PIN confidentiality and security are to be maintained during the payment transaction. Ensuring compatibility with these standards increases the technical complexity of the POS terminals and also increases costs.

It is an object of the present invention to provide an alternative method and system for executing retail transactions, which solution is secure, supports mobile transactions and reduces the hardware burden on the retailer.

SUMMARY OF THE INVENTION

Against this background, a first aspect of the present invention provides a token device for securely executing a data transaction protocol. The token device comprises: a secure element; a web server module configured within the secure element and arranged to transmit data messages over a network; a terminal application module configured within the web server module; and an application module configured within the secure element. The terminal application module and the application module are arranged to execute the data transaction protocol as one or more data exchanges therebetween within the secure element, upon receipt of a service request data message, received over the network at the web server module from an authorised remotely located POS terminal. The web server module is arranged to generate a transaction response data message for transmission to the remotely located POS terminal, on successful completion of the transaction protocol. The security of the data transaction protocol is improved by executing the data transaction protocol between the terminal application module and application module within the secure element. Furthermore, since execution of the data transaction protocol may only be initiated by receipt of a service request received from an authorised remotely located POS terminal, this reduces the risk of a fraudulent transaction being initiated within the secure element by a fraudulent device. Configuring the secure element with a web server module means that advantageously, the secure element is directly communicable over conventional, existing data networks, such as the internet. This means that the secure element may send data messages directly to and receive data messaged directly from the remotely located POS terminal, without the exchanged data messages requiring processing by any other logic circuits, which may be present within the token device, thus improving the security of data communications.

Preferably, the web server module is configured to determine if the received service request data message was sent from an authorised remotely located POS terminal, and to decline the service request where it is determined that the remotely POS terminal is not an authorised terminal.

The token device may relate to a mobile computing device provided with a Subscriber Identity Module (SIM) enabling the mobile computing device to communicate with remote devices over a mobile telecommunications network. The web server module may be communicable with the remotely located POS terminal via the mobile telecommunications network. In this way, advantageously the mobile computing device's existing mobile telecommunications network may be used for receiving the service request data message, and for transmitting the transaction response data message. By way of non-limiting example, the token device may relate to a smartphone, and the secure element's web server module is contactable via the smartphone's existing telecommunications network.

Preferably, the secure element is comprised within the SIM. This is advantageous because it enables the functionality of the present invention to be readily extended to existing mobile computing devices, by retrofitting existing mobile computing devices with a SIM comprising the secure element, without requiring any modification of existing mobile computing device hardware.

Alternatively, the token device may relate to a smartcard comprising an ICC and the secure element is configured within the ICC. In such embodiments, and where the smartcard does not comprise its own communications means, for example a NAD, the communications means of an external device, such as a dummy POS terminal, may be used to route the date communication messages between the token device and the remotely located POS terminal.

The web server module may be associated with a Uniform Resource Identifier (URI). This enables the token device to be contacted over existing data networks, since the URI uniquely identifies the token device within the data network.

The application module may comprise one or more different executable transaction applications, each transaction application being uniquely identifiable by an associated application identifier. The service request data message preferably comprises the application identifier, and the application module is arranged to execute a specific transaction application on the basis of the application identifier comprised in the received service request data message. This improves the versatility of the token device, since a plurality of different transaction applications are executable by the token device. By way of non-limiting example, the different transaction applications may relate to payment applications, voucher redemption applications, and/or loyalty applications.

The secure element may comprise one or more cryptographic keys or certificates, and the web server module is arranged to establish a secure communication channel with the remotely located POS terminal on the basis of a cryptographic key or certificate exchange with the remotely located POS terminal. Establishment of a secure communication channel between the web server module and the remotely located POS terminal ensures that all data communications between the web server module and the remotely located POS terminal are encrypted, improving security. Furthermore, the use of cryptographic keys or certificates may also be used as a means for the web server module to determine if the received service request message was sent from an authorised remotely located POS terminal.

Preferably, the secure element comprises an independent processor located within it, such that the terminal application module and the application module are executed independently from any processor native to the token device located externally to the secure element. This improves the security of the executed data transaction protocol, by avoiding any data transactions being processed, or otherwise tampered with by potentially insecure processors located within the token device. For example, this feature is particularly advantageous where the token device relates to a smartphone comprising, for example, an insecure Central Processing Unit (CPU) located externally to the secure element, and prevents confidential payment card data being processed in an insecure environment.

The web server module is preferably arranged to enable the secure element to communicate with the remotely located POS terminal using Hypertext Transfer Protocol (HTTP) and/or Hypertext Transfer Protocol Secure (HTTPS). In this way, the token device may advantageously use the existing infrastructure of the World Wide Web for communicating with the remotely located POS terminal.

In preferred embodiments the web server module is a SmartCard Webserver (SCWS), contactable over a communications network using HTTP and/or HTTPS.

A second aspect of the invention, which benefits from the same advantages as the above described first aspect, relates to a method of securely executing a data transaction protocol within a token device comprising a secure element. The secure element is provided with a terminal application module, an application module, and a web server module, and the terminal application module is comprised within the web server module. The method comprises receiving a transaction service request from a remotely located authorised POS terminal, at the web server module, the transaction service request prescribing a data transaction protocol to be executed within the secure element. The prescribed data transaction protocol is executed as one or more data exchanges between the terminal application module and the application module within the secure element. A transaction response date message is generated providing confirmation that the prescribed data transaction protocol was successfully executed within the secure element. The transaction response data message is transmitted from the token device to the remotely located POS terminal.

The receiving step preferably comprises: determining if the received transaction service request was received from an authorised POS terminal, and declining the service request where it is determined that the request was received from an unauthorised POS terminal.

The method may further comprise: receiving a first network address associated with the remotely located POS terminal; and transmitting a second network address associated with the token device's web server module to the remotely located POS terminal using the first network address, enabling the web server module to be contacted by the remotely located POS terminal. This step is advantageous where the token device does not comprise the network address of the remotely located POS terminal, and ensures that both the token device and the remotely located POS terminal are contactable by each other.

Preferably, the first and second network addresses are Universal Resource Identifiers (URIs) associated with the network addresses of respectively the token device's web server module and the remotely located POS terminal.

The method may also comprise: establishing a secure communication channel between the remotely located POS terminal and the token device prior to receipt of the transaction service request, such that all subsequent data communications between the remotely located POS terminal and the token device are encrypted. This further improves the security of the present method.

The establishing step may comprise exchanging one or more cryptographic keys or certificates with the remotely located POS terminal, and establishing the secure communication channel on the basis of the exchanged one or more cryptographic keys or certificates.

The purpose of the establishing step is to establish the eligibility of the POS terminal, and comprises determining if the received transaction service request was received from an authorised POS terminal, and declining the service request where it is determined that the request was received from an unauthorised POS terminal.

The application module may comprise one or more different transaction applications, each transaction application being uniquely identifiable by an associated application identifier and being arranged to execute a different transaction protocol, and the receiving step preferably comprises: receiving an application identifier from the remotely located POS terminal. The executing step preferably comprises: executing the transaction protocol associated with the received application identifier.

The executing step is preferably carried out within a secure processing environment of the secure element, which is independent to any other existing processing environments located externally to the secure element and native to the token device.

The receiving step preferably comprises: receiving the transaction service request using Hypertext Transfer Protocol (HTTP) and/or Hypertext Transfer Protocol Secure (HTTPS).

Where the token device is a mobile computing device, the receiving and transmitting steps are preferably carried out over a mobile telecommunications network.

Where the secure element is configured within a SIM, the receiving, executing and generating steps are preferably carried out within the SIM. Where the secure element is configured within an ICC located within a smartcard, the receiving, executing and generating steps are preferably carried out within the ICC. Both these features improve the security of the present method, by preventing insecure processing environments executing the aforementioned steps.

A third aspect of the present invention relates to a secure element for use within a token device, to enable the token device to securely execute a data transaction protocol. The secure element comprises: a web server module arranged to enable the secure element to transmit data messages over a network; a terminal application module configured within the web server module; and an application module. The terminal application module and the application module are arranged to execute the data transaction protocol as one or more data exchanges therebetween within the secure element, upon receipt of a service request data message, received over the network at the web server module from an authorised remotely located POS terminal. The web server module is arranged to generate a transaction response data message for transmission to the remotely located POS terminal, on successful completion of the transaction protocol.

In certain embodiments, the secure element may be comprised within an ICC. The ICC may be comprised within a smartcard.

Alternatively, the secure element may be comprised within a SIM, the SIM being arranged for use within a mobile computing device to communicate with remote devices over a mobile telecommunications network; and the web server module is communicable with the remotely located POS terminal via the mobile telecommunications network.

Preferred aspects of the first embodiment and their associated advantages also apply to the second and third aspects of the invention.

Figure 1A:
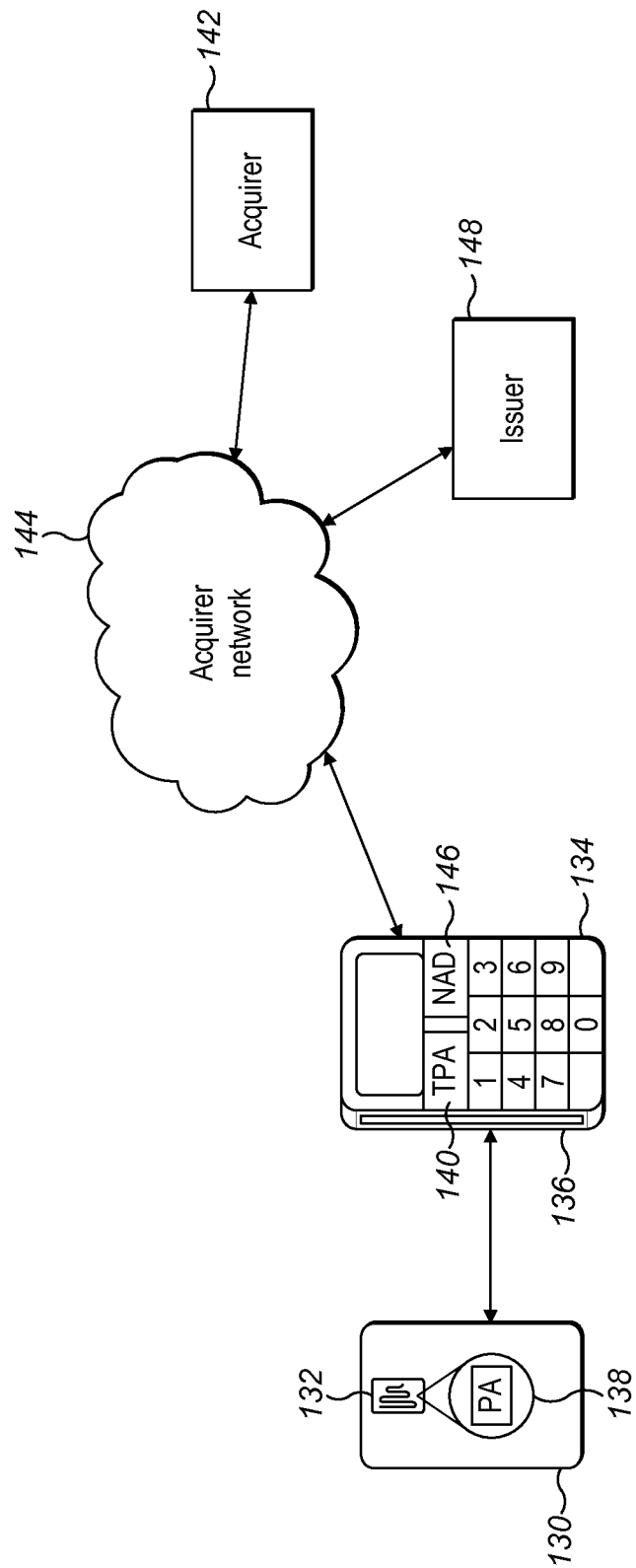
FIGS. 1a and 1b, which are schematic illustrations of respectively a known exemplary conventional credit/debit smartcard transaction system, and a conventional known virtual POS transaction system suitable for use by smartphones, have already been described above by way of background to the present invention.
Figure 1B:
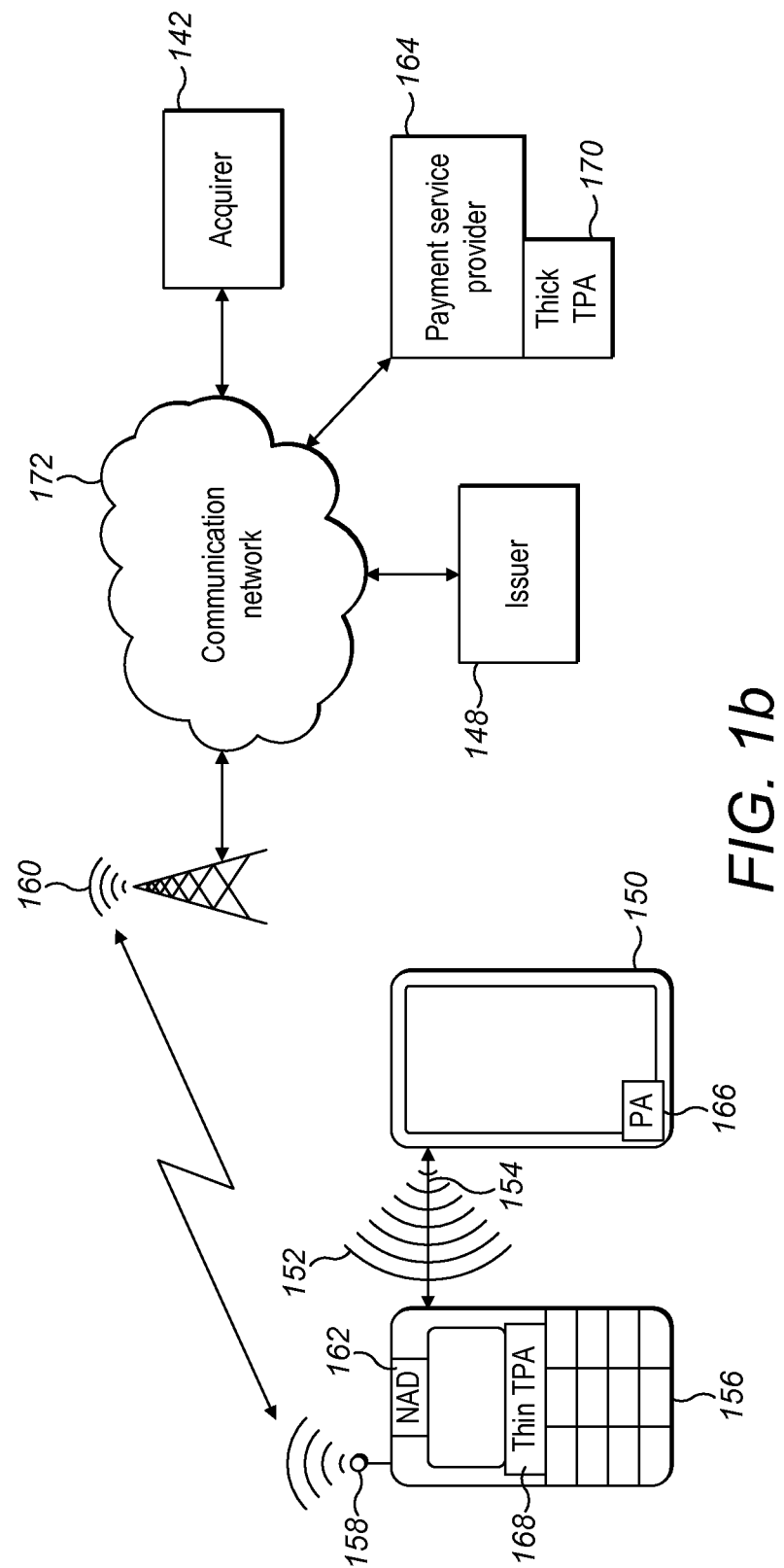
Figure 2A:
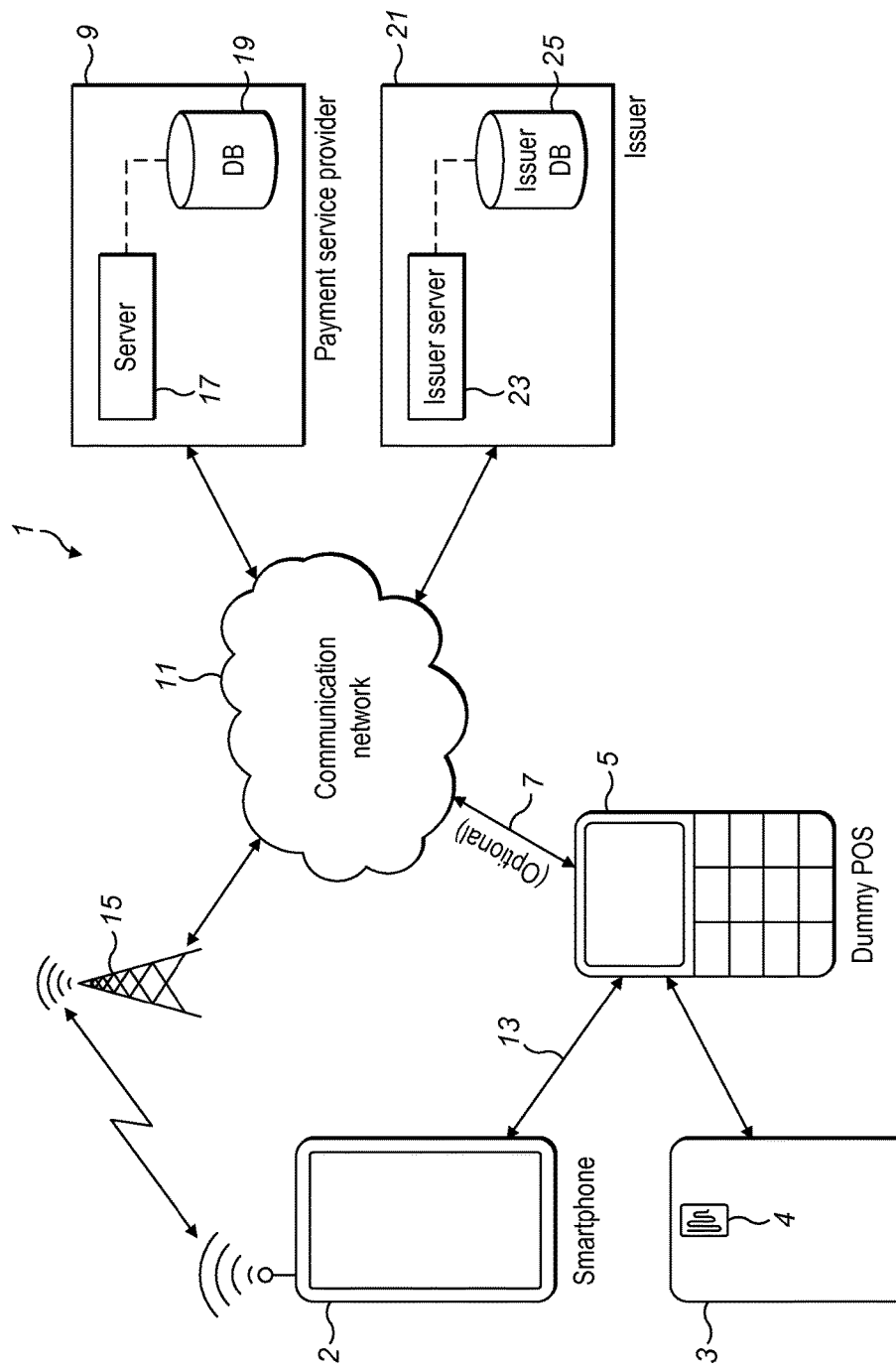
Figure 2B:
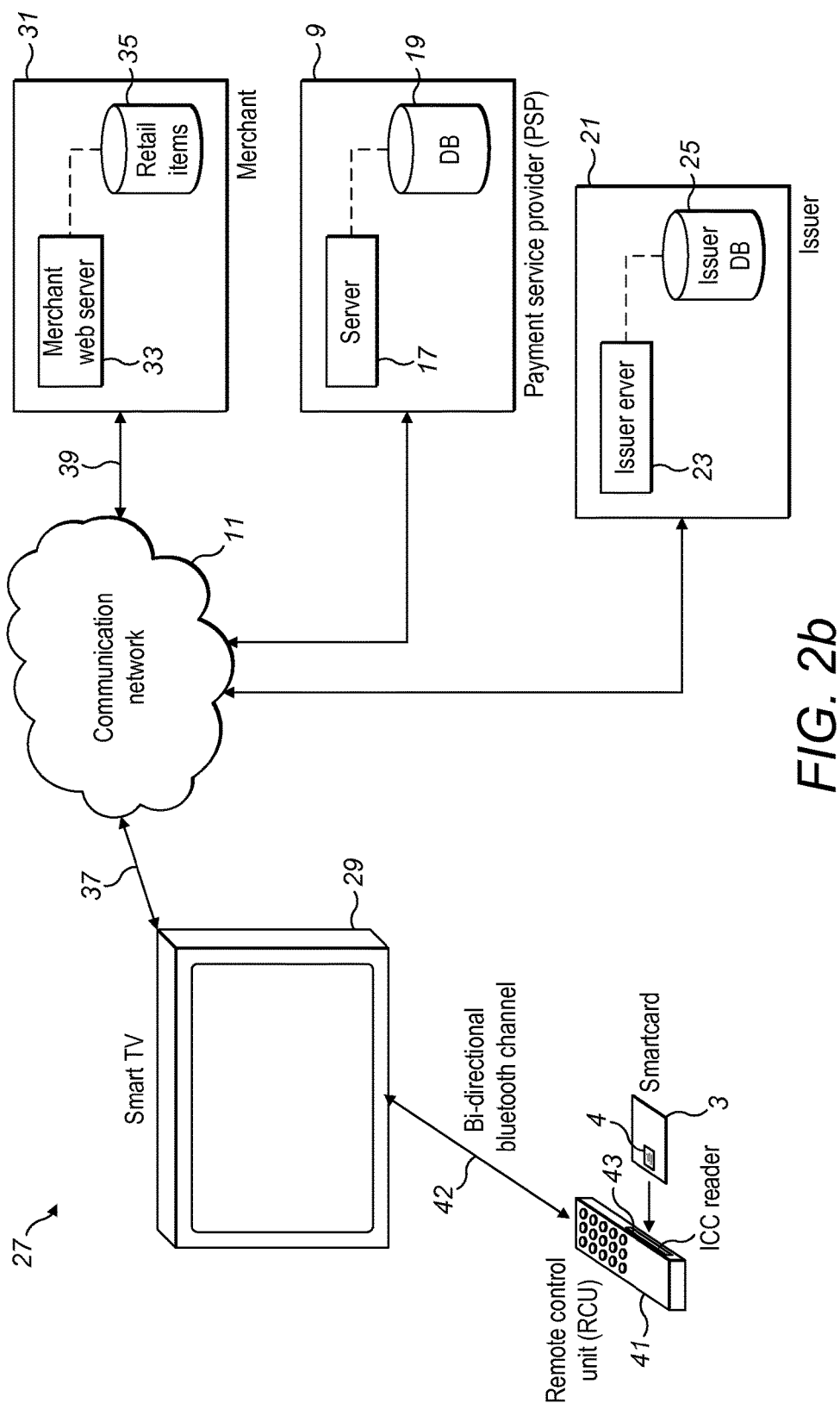
Figure 3:
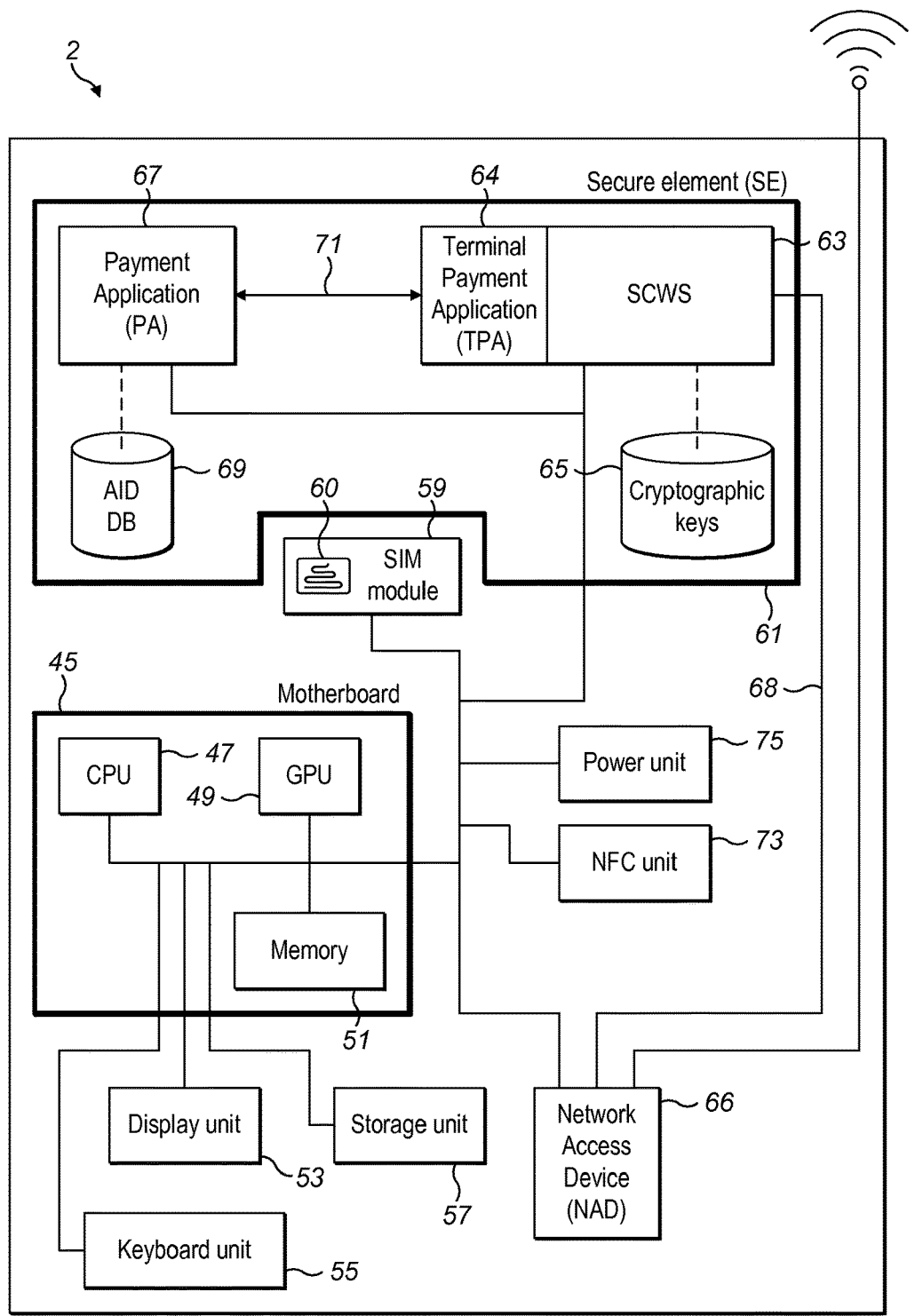
Figure 4A:
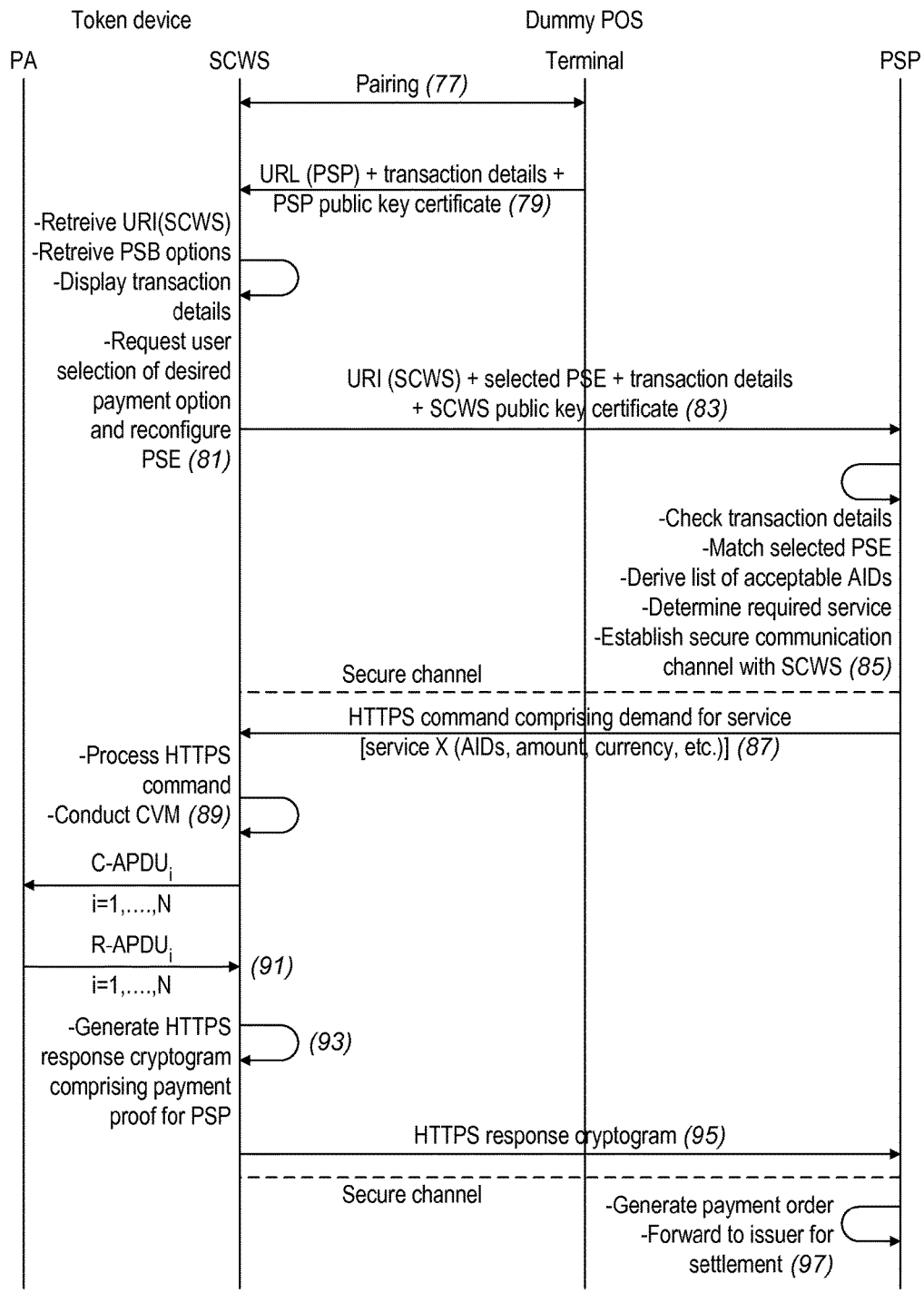
Figure 4B:
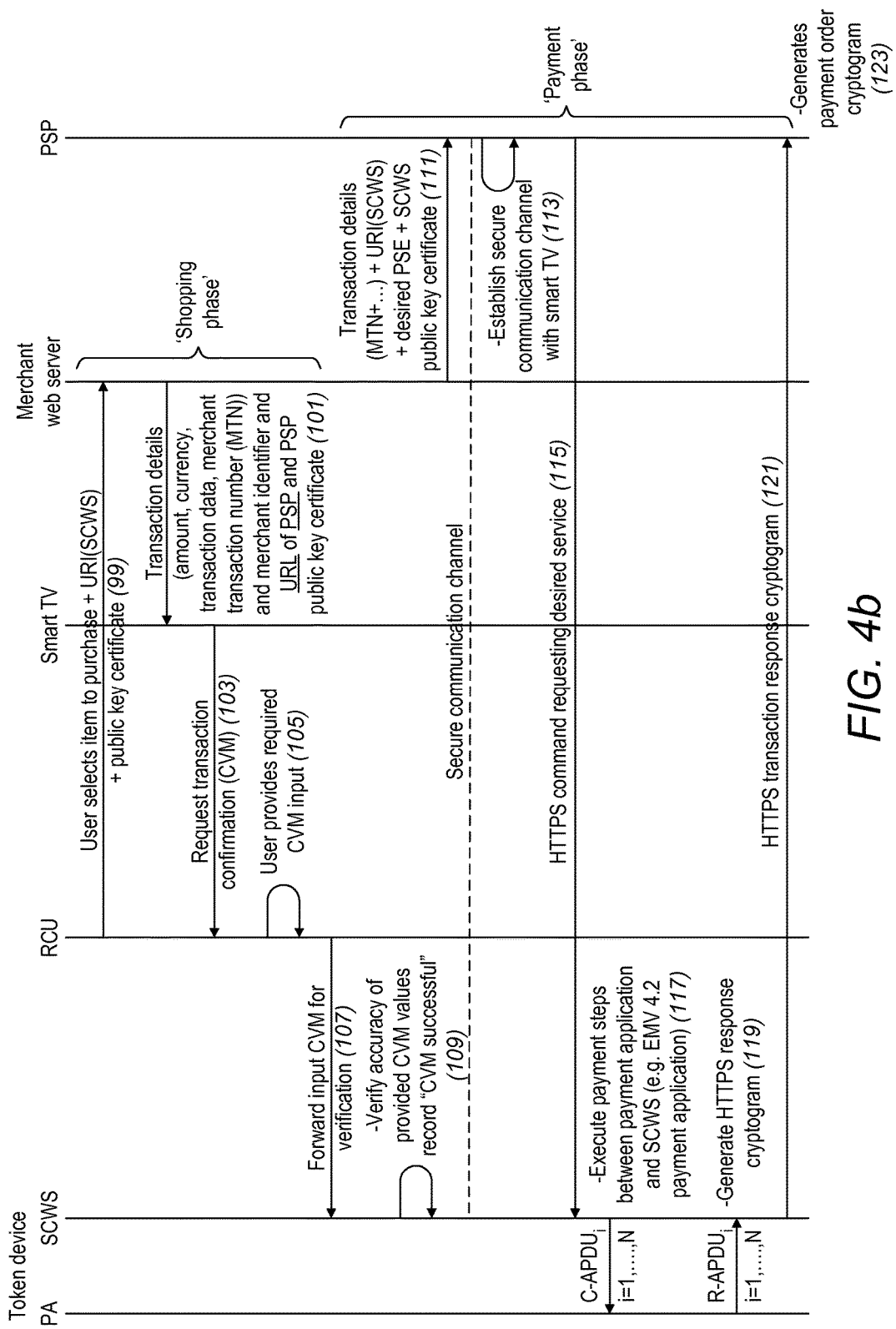

In order that the present invention may be more readily understood, specific embodiments of the present invention will now be described, by way of non-limiting example only, with reference to the accompanying figures, in which:

FIG. 2a is a schematic system overview of a cloud-based POS transaction system implemented in a physical retail environment; whilst FIG. 2b is a schematic system overview of a cloud-based POS transaction system implemented in a virtual tele-shopping retail environment;

FIG. 3 is a schematic functional diagram of a mobile telephone handset provided with a Secure Element (SE), which secure element is configured with a Smart Card Web Server (SCWS), and is compatible for use with the cloud-based POS transaction system of FIG. 2a;

FIG. 4a is a sequence diagram illustrating the data transactions occurring between the mobile telephone handset of FIG. 3, the dummy POS terminal and the payment service provider (PSP) of FIG. 2a; and FIG. 4b is a sequence diagram illustrating the data transactions occurring in the cloud-based POS transaction system of FIG. 2b.

DESCRIPTION OF THE INVENTION

FIGS. 2a and 2b show schematically an overview of two embodiments of cloud-based POS transaction systems in accordance with the present invention.

FIG. 2a shows a cloud-based POS system 1 for use in a physical retail environment, for example a store, and shows how a retail transaction may be effected using a token device. FIG. 2b shows a cloud-based POS system 27 for use in a virtual retail environment, for example tele-shopping. Each one of these examples is discussed in turn below.

Within the present context a token device may comprise any one of: mobile devices, such as smartphones (e.g. iPhone®, Android device etc.) or mobile tablets (e.g. iPad®); a smartcard or similar device provided with a secure element for securely executing a required transaction protocol with a remote payment service provider (PSP).

FIG. 2a provides two examples of a token device, namely a smartphone 2 and a smartcard 3 comprising an ICC 4. A dummy POS terminal 5 is located within the physical retail environment, and is provided with an optional communication channel 7, enabling communication with the PSP 9 via a shared communication network 11, which network may relate to the internet, or any other wide area network (WAN). The optional communication channel 7 of the dummy POS is required where the token device is not provided with its own communication means, such as a NAD for establishing a data connection with the PSP 9. For example, when the smartcard 3 is used with the dummy POS terminal 5 the optional communication channel 7 is required to enable a data connection to be established between the smartcard 3 and the PSP 9. This is described in further detail in the below description.

The present method may comprise two stages. The first stage is a handshake stage, wherein the contact details required to effect a desired transaction protocol are exchanged between the token device and the PSP 9, in addition to the required transaction details. The second stage is the transaction stage, wherein the transaction protocol required to effect payment for the desired merchandise is executed.

Operation of the cloud-based POS transaction system 1 of FIG. 2a will now be described by way of illustrative example, when used with respectively the smartphone 2 and subsequently with the smartcard 3 in a physical retail environment.

As a first step, the handshake stage comprises establishing a communication channel 13 between the smartphone 2 and the dummy POS terminal 5 located within the retail environment. The dummy POS terminal 5 is referred to as such to distinguish it from known POS terminals that comprise complex hardware circuitry, and which are arranged to implement payment functionality by executing a Terminal Payment Application (TPA) arranged to carry out complex transaction protocols, as previously described in the Background section. The most significant difference between the dummy POS terminal 5 and the conventional POS terminal is that the dummy POS terminal does not comprise a TPA and accordingly does not provide any payment functionality. Furthermore, the dummy POS does not provide any of the security functionality typically associated with known POS terminals (e.g., secure keyboard). The dummy POS terminal 5 comprises an ICC card reader, and/or a contactless front-end, and is configured to support Bearer Independent Protocol (BIP), TCP/IP, EMV Level 1, and ISO/IEC 144443 interfaces, which enables support for contactless integrated circuit cards.

The communication channel 13 operatively connecting the smartphone 2 to the dummy POS terminal 5 is established using any one of the different communication means shared by the smartphone 2 and the dummy POS terminal 5. For example, Bluetooth®, NFC, or any other shared communication means including, but not limited to, via means of a physical cable. The object of the communication channel 13 is to pass PSP contact details, and transaction details comprising merchant retailer information, along with the transaction amount to the smartphone 2. Once this data has been received by the smartphone 2, using the received PSP contact details, the smartphone is able to establish a direct line of communication with the PSP 9. The direct line of communication may be established, for example, using the smartphone's mobile telephone network 15, which is operatively coupled to the shared communication network 11, or to a wireless network connection.

On completion of the initial handshake stage, and once the smartphone 2 has been provided with the relevant details for establishing a direct line of communication with the PSP 9, the dummy POS 5 plays no further active role in the present method. Alternatively, in embodiments where the token device is not provided with an independent means for establishing a direct line of communication with the PSP 9, the dummy POS 5 may act as a data relay and/or a data router, forwarding data communications between the token device and the PSP 9. In such embodiment the dummy POS comprises its own NAD. In short, the dummy POS provides the token device with the means for communicating with the remote PSP 9.

The smartphone 2 is configured with a Smart Card Web Server (SCWS) provided in a Secure Element (SE) of the smartphone 2. The SCWS enables the smartphone's SE to be directly contactable by the PSP 9 using Hypertext Transfer Protocol (HTTP), including a secure layer like TLS or SSL (Secure Sockets Layer), which may result in a secure HTTP (HTTPS) connection. The SCWS is associated with a Uniform Resource Identifier (URI), which enables the SCWS, and by association the smartphone 2, to be uniquely identified and contacted over the shared communications network 11, by the PSP 9. The SCWS' URI is communicated to the PSP 9, during the initial handshake stage, when the smartphone 2 establishes the direct line of communication with the PSP 9.

By way of background, SCWS is an extension of the OPEN component of the GlobalPlatform 2.2 card technology, which enables a standard application, including applets, to provide a web service in a GlobalPlatform 2.2 compatible token device. An applet, as the reader skilled in the art will appreciate, is a small application commonly configured to perform one specific task that runs within the scope of a larger application. Applets can also refer to Java applets—namely, programs written in the Java programming language included in internet web pages. Applets are either standalone applications or extensions of other applications, such as plug-ins. For further information regarding SCWS technology, the interested reader is directed to the document "*Global Platform, Card Specification—Networked Framework*", version 1.0 having document reference GPC_SPE_019. The token device is also preferably configured to support Remote Access Management (RAM) over HTTP and/or HTTPS. A non-limiting example of RAM over HTTP/HTTPS is Secure Channel Protocol (SCP), and specifically SCP81. Data may be communicated securely with PSP 9 using HTTP/HTTPS when the SCWS is provided with SCP functionality. Currently, and by way of non-limiting example, this may be achieved using a token device compliant with Java card 2.2, and/or GlobalPlatform 2.2 card, and SCP81.

The smartphone's SE and the PSP 9 are provided with the cryptographic keys and security certificates, supported by the implemented transaction protocol, required to establish a secure communication channel between them, such that data may be securely and confidentially transmitted. Once the secure communication channel has been established with the PSP 9, all data transmissions between the smartphone 2 and the PSP 9 are securely encrypted and the two communicating parties are mutually authenticated.

In order to establish the secure communication channel, public cryptographic keys and security certificates are exchanged between the smartphone's SE and the PSP 9. For example, the Transport Layer Security (TLS) protocol version 1.2 may be used to establish the secure communication channel, wherein the public cryptographic keys and security certificates of both the smartphone 2 and the PSP 9 are exchanged and used to generate a shared pre-master secret, which in turn is used to generate session keys for use in encrypting subsequent data transmissions between the smartphone 2 and PSP 9. Other cryptographic protocols may be used to establish the secure communication channel, and such alternatives fall within the scope of the present invention. The above described TLS example is provided for illustrative purposes only.

The SE provides a trusted and tamper protected execution environment within which a TPA and a payment application (PA) are securely executed, and is configured as a write-protected digital black box. This maintains the security of the data stored and processed therein, comprising the security of the TPA, the PA, the cryptographic keys, and the security certificates used to establish the shared communication channel. For example, the SE may be configured to execute an EMV (Europay® MasterCard® Visa®) transaction protocol between the PA and the TPA in order to complete the retail transaction. Since the transaction protocol is executed within the SE, it is resistant to tampering or eavesdropping by any non-authorised malicious third parties.

WRITE privileges associated with the SE are restricted to authenticated devices. WRITE privileges indicate whether a device has been authorised to write and/or otherwise amend data stored within the SE. For example, this may include updating the PA or TPA. This ensures the authenticity of the transaction protocol executed within the SE, and the security of the cryptographic keys and security certificates used for establishing the secure communication channel. An instruction script written by an authenticated device is executable by the SE. The PSP 9 is one non-limiting example of an authenticated device. In this way, the PSP 9 is able to update the SE with its cryptographic keys and security certificates required to establish the secure communication channel, and to send an authentic service request to the payment token that will initiate payment transactions within the SE. In contrast, and since the SE is configured as a write-protected digital black box, a non-authorised device, such as a fraudulent smartphone handset, or a fraudulent server, is unable to obtain any of the confidential information stored within the SE, which would undermine the security of the secure communication channel and any generated transaction data, and is unable to initiate a payment transaction within the SE.

The PSP 9 comprises a networked server 17, arranged to run a webserver enabling communication with the smartphone's SE using HTTP or preferably HTTPS. The server 17 is operatively connected to a database 19, which database 19 comprises all the cryptographic keys and security certificates supported by the different transaction protocols that the PSP 9 is configured to support. In addition, the PSP database 19 comprises a list of all merchants authorised to use the service of the PSP 9.

Once the PSP server 17 has received all the transaction data from the smartphone's SCWS, and the secure communication channel has been established, the PSP server 17 issues a request to initiate a payment transaction to the SCWS. Receipt of a genuine transaction request from an authorised device at the SCWS initiates the payment transaction protocol. The payment transaction protocol is executed within the SE between the relevant PA and the TPA in the SCWS. Executing the payment transaction protocol typically comprises executing a sequence of data request and response exchanges between the PA and the TPA within the SE. The payment transaction protocol is successfully completed by generation of a transaction cryptogram, which is subsequently forwarded to the PSP server 17. The transaction cryptogram is effectively a digital receipt confirming to the PSP that the requested transaction protocol was successfully executed within the smartphone's SE. In turn, the PSP 9 generates a payment order on the basis of the received transaction cryptogram. The payment order is forwarded from the PSP 9 to the issuer 21 for settlement. The issuer 21 comprises an issuer server 23 and an issuer database 25. The issuer database 25 comprises a record of all authorised credit/debit accounts. The authenticity of the received payment order is verified by cross-referencing it with data comprised in the issuer database 25. Once the authenticity of the payment order has been successfully verified, the payment order is settled, and the required funds are transferred from the acquirer's bank account to the retailer's bank account in accordance with existing credit/debit card payment procedures.

It is important to note that in the above summarised example, the primary role of the dummy POS terminal 5 is to provide the smartphone 2 with the transaction details, and the PSP's contact details—e.g. the PSP's URL. The dummy POS terminal 5 does not otherwise participate in the data transactions between the smartphone 2 and the PSP 9. The PSP's URL enables the smartphone's SCWS to establish a direct data connection with the PSP 9 using HTTP and/or preferably HTTPS. The dummy POS terminal does not participate in the execution of the payment transaction protocol, which is carried out within the smartphone's SE between the PA and the TPA. This is explained in further detail in relation to FIG. 4a below.

When the cloud-based POS transaction system 1 of FIG. 2a is used in conjunction with the smartcard 3, the dummy POS terminal 5 provides a power source for the smartcard's ICC 4, in addition to providing the smartcard 3 with a physical communications means for transferring transaction data to the PSP 9. In this embodiment the dummy POS terminal 5 provides a data relay function, for relaying data exchanges between the PSP 9 and the smartcard 3 via the dummy POS terminal's optional communication channel 7. The smartcard's ICC 4 is configured as an SE and comprises a SCWS, enabling the PSP 9 to communicate with the smartcard 3 via preferably HTTPS, when the ICC 4 is powered by the dummy POS terminal 5. The remaining transaction steps are substantially identical to the previously described embodiment.

The cloud-based POS system 27 of FIG. 2b differs from the cloud-based POS system 1 of FIG. 2a in that the functionality provided by the dummy POS terminal 5 of FIG. 2a is provided by a television remote control unit (RCU) 41 in combination with a smart television (smart TV) 29. Within the present context, a smart TV is intended to refer to any television provided with network functionality (e.g. a NAD), for example internet functionality. The cloud-based POS system 27 of FIG. 2b will now be described within the context of use with a smartcard 3 however, it is to be appreciated that the cloud-based POS system 27 is also suitable for use with the smartphone 2 of FIG. 2a. The cloud-based POS system 27 functions substantially in the same way as the cloud-based POS system 1 of FIG. 2a.

A user browses the retail content displayed by a virtual merchant 31 within the virtual retail environment of the smart TV 29. To this end each virtual merchant 31 may comprise a merchant web server 33, which comprises a retail database 35 itemising all the merchandise available for sale, and displayed within the smart TV's graphical interface. Both the merchant web server 33 and the smart TV 29 are operatively coupled to the shared communication network 11, via respectively communication channels 37 and 39. The user is provided with an RCU 41 configured with an ICC reader 43, within which the smartcard 3 is inserted and its ICC 4 powered. The RCU 41 provides the user with the means for navigating within the virtual merchant's retail environment. The RCU 41 is preferably configured with a bi-directional communication channel 42, such as a bi-directional Bluetooth® channel. This means that the RCU 41 is configured to both transmit data communications to, and receive data communications from, the smart TV 29. The RCU 41 in combination with the networked smart TV 29, provide the smartcard 3 with the communication means for establishing a secure communication channel with the PSP 9.

Once the user has selected one or more retail items for purchase, a request comprising the selection and the smartcard's SCWS URI is forwarded to the relevant virtual merchant 31. The virtual merchant 31 forwards its response, comprising the transaction details, the virtual merchant identifier and the URL of the relevant PSP 9 to the smart TV 29. The virtual merchant 31 also forwards the smartcard's SCWS URI to the PSP 9, such that the PSP and the smartcard 3 can establish the secure communication channel, required to securely transmit the transaction cryptogram resulting from successful execution of the payment data protocol, executed within the smartcard's SE.

The secure communication channel between the PSP 9 and the smartcard 3 is established as described previously in relation to the embodiment of FIG. 2a, after which the payment transaction is initiated within the smartcard's SE, by receipt of an HTTP/HTTPS request at the SCWS from the PSP 9. The SCWS' URI is used by the PSP 9 for the purposes of forwarding the HTTP/HTTPS request for service which initiates execution of the payment data protocol required to effect the desired payment transaction within the SE. The payment transaction is executed, as described in relation to the previous embodiment, within the SE between the TPA in the SCWS and the relevant PA. On completion of the payment transaction, the resulting transaction cryptogram is forwarded from the smartcard 3 to the PSP 9 via the RCU 41, the smart TV 29 and the shared communication network 11. Upon receipt of the transaction cryptogram, the PSP 9 generates a payment order cryptogram, which is subsequently forwarded to the appropriate issuer 21 for settlement.

Further specific details of the cloud-based POS systems of FIGS. 2a and 2b are set out in the ensuing description.

FIG. 3 is a schematic diagram illustrating the functional components of the smartphone 2, used in the cloud-based POS transaction system 1 of FIG. 2a. The smartphone 2 comprises a motherboard 45, which motherboard comprises the central processing unit (CPU) 47; a graphical processing unit (GPU) 49; a volatile memory unit 51, such as a random memory access module or similar. The smartphone also comprises a display unit 53, which is controlled by the GPU 49. The display unit 53 may comprise a touch-screen for user entry of alphanumeric symbols and/or gestures, or alternatively the smartphone may comprise a keyboard 55. A non-volatile storage unit 57 is provided for storing data. The smartphone 2 is provided with a Subscriber Identity Module (SIM) 59, which comprises an ICC 60, such as a Universal Integrated Circuit Card (UICC). The SIM 59 stores the International Mobile Subscriber Identity (IMSI) and the associated key used to identify and authenticate subscribers on the smartphone 2. Network communication functionality is provided by the NAD 66, which relates to an electronic circuit configured to connect the smartphone 2 to a communication network, such as the mobile telecommunications network 15 of FIG. 2a, or to an existing wireless network.

The smartphone 2 is also configured with an SE 61. The SE 61 comprises an SCWS module 63 provided with a cryptographic key database 65, which contains all the cryptographic keys required to establish a secure communication channel with the PSP 9. The SCWS 63 is configured with a TPA 64. The SE 61 comprises a PA 67 configured to run within the SE 61. The PA 67 is operatively coupled to an application identification (AID)—database 69. The AID database 69 comprises a list of all the supported payment applications, executable in the SE 61. The TPA 64 within the SCWS 63 and the PA 67 are operatively coupled by means of a shared communication channel 71 within the SE 61. In this way, the SCWS 63 and the PA 67 are able to execute the data exchanges of the required payment application. The SCWS 63 may be operatively connected to the NAD 66 via a shared communication channel 68. In this way, the PSP 9 may contact the SCWS 63 directly, without data communications from the PSP 9 being routed through the smartphone's motherboard 45 and the CPU 47. This improves security and reduces the likelihood of the confidentiality of data communications from the PSP 9 or from the SCWS 63 being compromised.

The smartphone 2 also comprises an NFC unit 73, which provides near-field data communication functionality. This enables the smartphone 2 to establish the data connection with the dummy POS terminal 5, as described previously in relation to FIG. 2a. The NFC unit 73 is preferably operatively connected to the SE 61. This enables the SE 61 to control operation of the NFC unit 73. The functional components of the smartphone 2 are powered by the smartphone's power unit 75, including the NFC unit 73. The NFC unit 73 provides the smartphone 2 with one way for communicating with the dummy POS 5. The smartphone 2 may also comprise alternative communication units such as Bluetooth®, as mentioned previously.

The SE 61 is a trusted execution environment, and accordingly is provided with its own processing means. For example, the SE 61 may be provided with its own processing unit for executing the payment data protocol. All processing activity within the SE 61 is self-contained. In other words, the TPA 64 within the SCWS 63 and the PA 67 are executed using the SE's native processing means, to improve security and maintain data confidentiality.

Alternatively, and for those smartphones not configured with their own SE 61, the functionality of the SE 61 may be provided by the SIM module 59. In such examples the SIM module's ICC 60 is configured with the functional modules of the SE 61 comprising the SCWS 63, the TPA 64, cryptographic key database 65, PA 67 and AID database 69.

The SCWS 63 is executed within the SE 61, independently from the smartphone's CPU 47. This reduces the risk of the SCWS' integrity being compromised or hacked when used with a fraudulent mobile handset. This ensures that the CPU of a fraudulent handset is unable to initiate fraudulent data transaction exchanges between the PA 67 and TPA 64, since both the TPA 64 and the PA 67 are entirely comprised within the SCWS 63, which is only responsive to requests from authorised devices sent using the established secure communication channel. In other words, a fraudulent handset is unable to deceive the SCWS 63, the TPA 64 and the PA 67 into participating in a fraudulent transaction.

In contrast with the smartphone 2, the ICC 4 of the smartcard 3 suitable for use with the cloud-based POS systems of FIGS. 2a and 2b is configured with the SE comprising the SCWS 63, the PA 67, AID database 69 and the cryptographic key database 65.

FIG. 4a is a data sequence diagram outlining the different steps comprised in the present method, when the smartphone 2 is used in the cloud-based POS system of FIG. 2a.

The method is initiated when the smartphone 2 is paired with the dummy POS terminal 5, at step 77. As mentioned previously, the object of the pairing is to establish a temporary communication channel 13 over a short distance between the smartphone 2, and specifically the smartphone's SE 61, and the dummy POS terminal 5. As mentioned previously, this may be achieved using Bluetooth® or NFC using the smartphone's NFC unit 73, for example. Pairing informs each one of the smartphone 2 and the dummy POS terminal 5 of the other's physical presence. Once the smartphone 2 and the dummy POS terminal 5 are paired, and the temporary communication channel 13 established, the dummy POS terminal 5 transmits the PSP's contact details, the transaction details, and the PSP's public key certificates to the smartphone's SE 61, at step 79.

The transaction details comprise merchant identifier information (Merchant_ID), the amount of the transaction, and currency information. The PSP contact details comprise the PSP's URL, enabling the PSP server 17 to be directly contacted by the smartphone's SCWS 63 using preferably HTTPS.

Upon receipt of the PSP contact details and the transaction details, the smartphone's SCWS 63 retrieves its associated URI, and the Payment System Environment (PSE) options, and requests user selection of the desired payment option, at step 81. The PSE options outline the different payment options supported by the SCWS 63. For example, the PSE options might relate to selecting between available payment cards (e.g. selecting between credit and/or debit cards). Similarly, the PSE options might also comprise different available loyalty cards and/or electronic vouchers. For example, on the basis of the received Merchant_ID, the SCWS determines which available loyalty cards and/or electronic vouchers are selectable for remittance.

The different available payment options are displayed on the smartphone's display unit 53, at step 81. The user is requested to select one of the available payment options. Once the user has selected the desired payment option, the SCWS 63 reconfigures the PSE settings in accordance with the selected option. The PSE settings determine which PA is selected for use in the SE 61. Each PA is uniquely identifiable by its associated AID.

Using the PSP's URI and the PSP's public encryption key, the smartphone's SCWS forwards an encrypted data transmission directly to the PSP 9, at step 83. The encrypted data transmission comprises the SCWS' URI, the selected PSE, the transaction details, and the SCWS' one or more cryptographic keys and/or associated security certificates.

Receipt of the SCWS' URI enables the PSP 9 to communicate directly with the smartphone's SCWS, whereas receipt of the SCWS' cryptographic keys and/or security certificates, enables the secure communication channel to be established between the smartphone's SE 61 and the PSP 9.

The PSP 9 decrypts the received data transmission using its private decryption key. The transaction details are reviewed; the PSP's list of available applications are amended in accordance with the settings prescribed in the received data transmission from the SCWS 63 and a shortlist of the acceptable AIDs is derived by the PSP 9; the required service request message is generated; and a secure communication channel with the smartphone's SCWS 63 within the SE 61 is established, at step 85. All subsequent data exchanges between the smartphone's SE 61 and the PSP 9 are executed via the shared secure communication channel. The secure communication channel is established as discussed previously, using TLS protocol version 1.2, for example.

Review of the transaction details comprises several different steps including cross-referencing the received Merchant_ID with the PSP database 19 to determine if the merchant associated with the received Merchant_ID is authorised to use the services of the PSP 9. If the received Merchant_ID is associated with a merchant that is not entitled to use the services of the PSP 9, a refusal of service message is forwarded to the smartphone's SCWS 63. The received SCWS' URI is cross-referenced with a list of black listed URIs, which list of black listed URIs is maintained in the PSPs database 19. If the received SCWS URI is blacklisted, the PSP 9 returns a refusal of service message to the smartphone's SCWS 63.

Amending the PSP's list of accepted payment means in accordance with the PSE settings prescribed within the received data transmission comprises generating a shortlist, at the PSP 9, of AIDs supported by the PSP 9 that comply or otherwise satisfy the user's prescribed PSE settings. Once the shortlist of available AIDs has been generated, a subset of the shortlist comprising one or more AIDs is selected for use in the current transaction. How this is achieved is now described more thoroughly. The prescribed PSE settings comprised within the received data transmission also comprise a list of compatible AIDs, arranged in the user's order of preference. The list of compatible AIDs is used to identify the subset of one or more AIDs for use in the current transaction, by selecting the AIDs that are mutually supported by the PSP 9 and the SCWS 63 using both the list of compatible AIDs received from the SCWS and the list of AIDs available to the PSP 9. This selection is often a compromise between the smartphone user's PSE preferences and the PSP's capabilities.

The required service request message is generated by the PSP 9 on the basis of the received transaction details and the one or more selected AIDs. The service request message comprises information concerning the transaction details, such as the amount of the transaction, the currency, and the Merchant_ID. The transaction message also comprises the one or more AIDs of the required PA 67. The service request message is hashed using a hash function to output a MAC and encrypted using the keys generated during establishment of the secure communication channel, in accordance with the TLS protocol version 1.2. This improves the security and confidentiality of the service request message. The service request message is forwarded to the SCWS 63 preferably using HTTPS, at step 87. Receipt of the service request message initiates the required payment transaction protocol between the relevant PA 67 and the TPA 64 within the SCWS 63. The payment transaction protocol is a data transaction protocol, which may relate to an EMV compliant transaction protocol, executed between the TPA 64 and the PA 67.

Upon receipt of the service request message at the SCWS 63, it is decrypted using the appropriate one or more cryptographic keys and the MAC is verified. The contents of the request are processed by the TPA 64 within the SCWS 64, at step 89. This processing comprises selecting and executing the selected PA 67 on the basis of the one or more received AIDs. The executed PA 67 may require completion of a Cardholder Verification Method (CVM), which may comprise user entry of a confidential Personal Identification Number (PIN), or any other alphanumeric string and/or other validation means provided by the smartphone user using the smartphone's native keyboard unit 55 or any other identity input device (e.g., biometric sensor), which confirms the user's identity to the SCWS 63 and/or the PA 67.

On successful completion of the CVM, the remaining payment transaction exchanges are executed between the TPA 64 within SCWS 63 and the PA 67 within the SE 61. This may comprise several Application Protocol Data Unit (APDU) exchanges between the TPA 64 and the PA 67, as illustrated in step 91. For example, the TPA 64 in the SCWS 63 may forward a Command APDU (C-APDU) to the PA 67. The PA 67 processes the received C-APDU in accordance with its internal logic, and replies with a Response APDU (R-APDU). Depending on the implemented PA, and despite only one command and response APDU data pairs being illustrated in FIG. 4a, it is to be appreciated that a plurality of such command and response APDU data pair exchanges may be required. The number of required APDU data exchange pairs will be dependent on the executed PA 67.

To complete the payment transaction, and once the required APDU data exchanges have been executed, an HTTPS transaction response cryptogram is generated, at step 93. The transaction response cryptogram provides the PSP 9 with proof that the payment data protocol was successfully executed for the required transaction, and is forwarded to the PSP 9, at step 95, from the SCWS 63, using the PSP's URL, over the secure communication channel. To this end, the HTTPS response is hashed and encrypted with the appropriate cryptographic keys (e.g. the keys generated using TLS protocol version 1.2) prior to transmission to the PSP 9. The PSP 9 decrypts the received HTTPS transaction response cryptogram and verifies the MAC using the appropriate cryptographic keys, and uses it to generate a payment order, at step 97. This completes the present method. The payment order is subsequently forwarded to the relevant issuer 21 for settlement, as mentioned previously, and in accordance with established procedures.

In those embodiments where the executed payment data transaction relates to an EMV protocol, then the HTTPS response cryptogram may comprise a DE 55 data element in compliance with ISO 8583.

It is important to appreciate that the payment data transaction is executed within the SE 61 between the TPA 64 and the PA 67—in other words, execution of the payment data protocol is self-contained within the SE 61 with no participation by any external devices, including the issuer. By configuring the token device with an SE comprising an SCWS, it is possible for a remotely located, cloud-based POS to initiate payment data protocols within the SE using HTTP and preferably HTTPS.

In alternative embodiments, the data transaction protocol executed by the selected PA 67 may require some form of issuer verification prior to issuance of the HTTPS response cryptogram at step 95. For example, certain variants of EMV require online issuer verification. The present method may be adapted to cater for such embodiments. For example, and with reference to FIG. 4a, this can be achieved by introducing two additional data exchanges between steps 93 and 95. The first additional exchange comprises the PA 67 generating an ARQC (Authorisation Request Cryptogram) and forwarding it to an issuer 21 (see FIG. 2a), via the SCWS 63, and the PSP 9. Upon receipt of the ARQC, the issuer 21 performs an online authorization request to determine if there are sufficient funds in the smartphone user's account. The issuer 21 then determines on the basis of the obtained funds information whether the requested transaction can be successfully completed. The issuer subsequently generates an ARPC (Authorisation Response Cryptogram) and forwards the ARPC back to the TPA 64 within the SCWS 63. The TPA 64 generates a second Generate Application Cryptogram (Generate AC) and submits the ARPC to the PA 67. After successful verification, the PA 67 responds to the final response cryptogram received from the TPA 64. The TPA 64 then forwards the response cryptogram as indicated in step 95 of FIG. 4a to the PSP.

The method carried out in the cloud-based POS system of FIG. 2b will now be described with reference to the data sequence diagram of FIG. 4b. In this embodiment, the functionality of the dummy POS 5 of FIG. 2a is provided by the RCU 41 and the smart TV 29. The method used to effect a transaction in the virtual retail environment of tele-shopping is set out below.

In this embodiment it is envisaged that the user will navigate through the virtual retail environment using the RCU 41, which is configured with an ICC card reader 43 arranged to receive the user's smartcard 3. Once the user has identified and selected one or more items for purchase through the smart TV's graphical interface, a data message comprising both the user's selected purchase item and the smartcard's SCWS URI is forwarded to the virtual merchant 31, at step 99. The SCWS URI is obtained from the smartcard 3. Alternatively, the smart TV 29 may be configured with the SCWS' URI. All data messages between the smartcard 3 and the virtual merchant 31 are forwarded from the smartcard 3 to the smart TV 29 via the RCU's bi-directional communication channel 42. The data messages are subsequently forwarded from the smart TV 29 to the virtual merchant 31 via the shared communication network 11 and respective communication channels 37, 39 operatively coupling each one of the smart TV 29 and the virtual merchant 31 to the shared communication network 11.

The data message is received and processed at the virtual merchant's web server 33. On the basis of the selected retail items, the corresponding transaction details are generated, which comprise the transaction amount, currency, transaction date, Merchant Transaction Number (MTN) and the merchant identifier. The generated transaction details are forwarded to the smart TV 29 along with the URL of the virtual merchant's PSP 9, and the PSP's public key certificate, at step 101. The received data is stored in the smart TV 29 for logging purposes. Receipt of the PSP's URL enables the smart TV 29 to communicate with the virtual merchant's PSP 9 for payment purposes.

In step 103, a transaction confirmation request is forwarded from the smart TV 29 to the RCU 41. The transaction confirmation request comprises a summary of the user requested transaction, and requires completion of a CVM in order to confirm the requested transaction. The CVM may require PIN verification, wherein the PIN is provided by the user for verification, using the RCU's keypad. Alternative forms of CVM may also be provided for. For example, it is envisaged that the RCU may be provided with a biometric sensor, such as a fingerprint sensor, wherein the user's fingerprint is scanned and verified with the user's pre-stored biometric data comprised within the smartcard 3. The required CVM input is provided by the user at step 105, via the RCU 41. The user provided CVM input is forwarded to the smartcard's SCWS for verification, at step 107. The provided CVM input is verified by the SCWS at step 109. On successful verification, a CVM successful result is recorded by the SCWS. The CVM successful result may be included in the subsequent HTTPS transaction response cryptogram, and provides the PSP 9 and/or the issuer 21, as the case may be, with confirmation that the CVM was successfully verified. The CVM verification step is executed on the smartcard's SE to preserve the confidentiality of sensitive data, such as a PIN, or biometric information associated with the user used for CVM purposes.

In step 111, the transaction details, the URI associated with the smartcard's SCWS, the desired PSE options, and the SCWS' public key certificate are forwarded from the virtual merchant 31 to the PSP 9, and specifically from the merchant web server 33 to the PSP server 17. This provides the relevant PSP 9 with the SCWS' contact details, and public key certificate, which are required for establishing the secure communication channel and for initiating the relevant payment data transaction in the smartcard's SE. For completeness, it is to be appreciated that step 111 may occur at any time after the virtual merchant 31 has obtained the transaction details, the SCWS' URI and the SCWS' public key certificate, at step 99. For illustrative purposes only, step 111 is shown in FIG. 4b as occurring after CVM verification, at step 109. However, this is not to be construed as limiting the present method.

The secure communication channel is established between the smartcard's SE and the relevant PSP 9, as described previously in relation to FIGS. 2a and 4a, at step 113 upon receipt off the transaction details at the PSP 9. This step is analogous to step 85 of FIG. 4a, and also comprises checking if the SCWS' URI is blacklisted. All subsequent data communications between the smartcard's SE and the PSP 9 are hashed and encrypted, to secure them from eavesdroppers.

The PSP 9 generates an HTTPS demand for service, at step 115. This is analogous to step 87 of FIG. 4a. The HTTPS demand comprises the AID of the relevant PA, and the transaction details. The relevant AID is selected in the same manner as previously described in relation to step 85 of FIG. 4a.

Receipt of the HTTPS demand for service initiates the relevant payment data transaction within the smartcard's SE, as prescribed by the received AID, at step 117. This step is substantially identical to step 91 of FIG. 4a. On completion of the APDU data exchanges, an HTTPS response cryptogram is generated, at step 119, providing payment proof for the PSP 9. The HTTPS response cryptogram is forwarded to the PSP 9, at step 121. Upon receipt of the response cryptogram, the PSP 9 generates a payment order for the relevant issuer 21, which completes the present method.

Whilst the functionality of the cloud-based POS system of FIGS. 2b and 4b has been described when used in conjunction with a smartcard 3, the system may also be used in conjunction with a smartphone, such as the smartphone 2 illustrated in FIG. 3. In such alternative embodiments, it is envisaged that the functionality of the RCU 41 is provided by the smartphone 2. Communication between the smart TV and the smartphone 2 may be carried out using Bluetooth, for example, or any other shared communication means.

Whilst the preceding embodiments of the present method have been described with respect to a mobile telephone and a smartcard, the present method can be implemented with any type of token device configured with a secure element having a PA and a SCWS comprising a TPA, and such embodiments fall within the scope of the present invention. Accordingly, the described embodiments are provided for illustrative purposes only, and are not to be construed as limiting the present invention.

The present invention may also be configured to support loyalty card payment schemes. In such embodiments the SE may be configured with loyalty card payment applications. The loyalty card payment applications may be comprised within the PA and are uniquely identifiable by their associated AID.

Similarly, the present invention may also be configured to support voucher payment schemes, by configuring the PA with voucher payment applications.

The invention claimed is:

1. A token device for securely executing a data transaction protocol, the token device comprising:
    a secure element comprising a processor and memory;
    a web server module configured within the secure element, running on the processor of the secure element, and arranged to transmit data messages over a network, wherein the web server module is configured to be contacted over the network via a uniform resource identifier;
    a terminal application module configured within the web server module;
    an application module configured within the secure element;
    the terminal application module and the application module being arranged to execute, using the processor of the secure element, the data transaction protocol as one or more data exchanges therebetween within the secure element, upon receipt of a service request data message, received over the network at the web server module from an authorised remotely located Point of Sale (POS) terminal, the service request data message using the uniform resource identifier of the web server module as a destination address; and wherein
    the web server module is arranged to generate a transaction response data message which is transmitted to the remotely located POS terminal on successful completion of the transaction protocol.

2. The token device of claim 1, wherein the web server module is configured to determine if the received service request data message was sent from an authorised remotely located POS terminal, and to decline the service request where it is determined that the POS terminal is not an authorised terminal.

3. The token device of claim 1, wherein the application module comprises one or more different transaction applications, each transaction application being uniquely identifiable by an associated application identifier, and the service request data message comprises the application identifier; and wherein
    the application module is arranged to execute a specific transaction application on the basis of the application identifier comprised in the received service request data message.

4. The token device of claim 1, wherein the secure element comprises one or more cryptographic keys or certificates, and the web server module is arranged to establish a secure communication channel with the remotely located POS terminal on the basis of a cryptographic key or certificate exchange with the remotely located POS terminal.

5. The token device of claim 1, wherein the processor of the secure element is an independent processor, such that the terminal application module and the application module are executed independently from any processor native to the token device located externally to the secure element.

6. The token device of claim 1, wherein the web server module is arranged to enable the secure element to communicate with the remotely located POS terminal using Hypertext Transfer Protocol (HTTP) and/or Hypertext Transfer Protocol Secure (HTTPS).

7. The token device of claim 1, wherein the web server module is a SmartCard Web server (SCWS).

8. The token device of claim 1, wherein the token device is a smartcard comprising an Integrated Circuit Chip (ICC) and the secure element is configured within the ICC.

9. The token device of claim 1, wherein the token device is a mobile computing device provided with a Subscriber Identity Module (SIM) enabling the mobile computing device to communicate with remote devices over a mobile telecommunications network; and
    the web server module is communicable with the remotely located POS terminal via the mobile telecommunications network.

10. The token device of claim 9, wherein the secure element is comprised within the SIM.

11. A method of securely executing a data transaction protocol within a token device comprising a secure element having a processor and memory and provided with a terminal application module, an application module, and a web server module running on the processor of the secure element, the terminal application module being comprised within the web server module, and the method comprising:
    receiving a transaction service request data message from a remotely located authorised Point of Sale (POS) terminal at the web server module, the service request data message using a uniform resource identifier of the web server module as a destination address, wherein the web server module is configured to be contacted over the network via the uniform resource identifier, the transaction service request data message prescribing a data transaction protocol to be executed within the secure element;
    executing the prescribed data transaction protocol using the processor of the secure element as one or more data exchanges between the terminal application module and the application module within the secure element;
    generating a transaction response data message, the transaction response data message providing confirmation that the prescribed data transaction protocol was successfully executed within the secure element; and
    transmitting the transaction response data message from the token device to the remotely located POS terminal.

12. The method of claim 11, wherein the receiving step comprises:
    determining if the received transaction service request was received from an authorised POS terminal, and declining the service request where it is determined that the request was received from an unauthorised POS terminal.

13. The method of claim 11, comprising:
    receiving a first network address associated with the remotely located POS terminal; and
    transmitting the uniform resource identifier of the token device's web server module to the remotely located POS terminal using the first network address, enabling the web server module to be contacted by the remotely located POS terminal.

14. The method of claim 13, wherein the first network address is a uniform resource identifier associated with the network address the remotely located POS terminal.

15. The method of claim 11, comprising:
establishing a secure communication channel between the remotely located POS terminal and the token device prior to receipt of the transaction service request, such that all subsequent data communications between the remotely located POS terminal and the token device are encrypted.

16. The method of claim 15, wherein the establishing step comprises:
exchanging one or more cryptographic keys or certificates with the remotely located POS terminal, and establishing the secure communication channel on the basis of the exchanged one or more cryptographic keys or certificates.

17. The method of claim 11, wherein the application module comprises one or more different transaction applications, each transaction application being uniquely identifiable by an associated application identifier and being arranged to execute a different transaction protocol, and the receiving step comprises:
receiving an application identifier from the remotely located POS terminal; and the executing step comprises:
executing the transaction protocol associated with the received application identifier.

18. The method of claim 11, wherein the executing step is carried out within a secure processing environment of the secure element, which is independent to any other existing processing environments located externally to the secure element and native to the token device.

19. The method of claim 11, wherein the receiving step comprises:
receiving the transaction service request using Hypertext Transfer Protocol (HTTP) and/or Hypertext Transfer Protocol Secure (HTTPS).

20. The method of claim 11, wherein the token device is a mobile computing device, and the receiving and transmitting steps are carried out over a mobile telecommunications network.

21. The method of claim 20, wherein the secure element is configured within a Subscriber Identity Module (SIM), and the receiving, executing and generating steps are carried out within the SIM.

22. The method of claim 11, wherein the secure element is configured within an Integrated Circuit Chip (ICC) located within a smartcard, and the receiving, executing and generating steps are carried out within the ICC.

23. A secure element, comprising a processor and memory, for use within a token device, to enable the token device to securely execute a data transaction protocol, the secure element comprising:
a web server module, running on the processor of the secure element, arranged to enable the secure element to transmit data messages over a network, wherein the web server module is configured to be contacted over the network via a uniform resource identifier;
a terminal application module configured within the web server module;
an application module;
the terminal application module and the application module being arranged to execute, using the processor of the secure element, the data transaction protocol as one or more data exchanges therebetween within the secure element, upon receipt of a service request data message, received over the network at the web server module from an authorised remotely located Point of Sale (POS) terminal, the service request data message using the uniform resource identifier of the web server module as a destination address; and wherein
the web server module is arranged to generate a transaction response data message which is transmitted to the remotely located POS terminal on successful completion of the transaction protocol.

24. The secure element of claim 23, wherein the web server module is configured to determine if the received service request data message was sent from an authorised remotely located POS terminal, and to decline the service request where it is determined that the POS terminal is not an authorised terminal.

25. The secure element of claim 23, wherein the application module comprises one or more different transaction applications, each transaction application being uniquely identifiable by an associated application identifier, the service request data message comprises the application identifier; and wherein
the application module is arranged to execute a specific transaction application on the basis of the application identifier comprised in the received service request data message.

26. The secure element of claim 23, comprising:
one or more cryptographic keys or certificates stored within the secure element; and wherein
the web server module is arranged to establish a secure communication channel with the remotely located POS terminal on the basis of a cryptographic key or certificate exchange with the remotely located POS terminal.

27. The secure element of claim 23, wherein the web server module is arranged to enable the secure element to communicate with the remotely located POS terminal using Hypertext Transfer Protocol (HTTP) and/or Hypertext Transfer Protocol Secure (HTTPS).

28. The secure element of claim 23, wherein the web server module is a SmartCard Webserver (SCWS).

29. The secure element of claim 23, comprised within an Integrated Circuit Chip (ICC).

30. The secure element of claim 29, comprised within an ICC of a smartcard.

31. The secure element of claim 29, comprised within a Subscriber Identity Module (SIM), the SIM being arranged for use within a mobile computing device to communicate with remote devices over a mobile telecommunications network; and
the web server module is communicable with the remotely located POS terminal via the mobile telecommunications network.

* * * * *